United States Patent
Orisich et al.

(10) Patent No.: US 9,316,376 B2
(45) Date of Patent: Apr. 19, 2016

(54) LIGHTING AND/OR SIGNALING DEVICE HAVING IMPROVED LIGHT EFFICIENCY AND DUAL COLOR FUNCTION

(71) Applicant: Valeo Lighting Systems North America, LLC, Seymour, IN (US)

(72) Inventors: John Steven Orisich, Columbus, IN (US); Brant James Potter, Columbus, IN (US); Matthew James Berry, Seymour, IN (US)

(73) Assignee: Valeo North America, Inc., Seymour, IN (US)

( * ) Notice: Subject to any disclaimer, the term of this patent is extended or adjusted under 35 U.S.C. 154(b) by 0 days.

(21) Appl. No.: 14/452,097

(22) Filed: Aug. 5, 2014

(65) Prior Publication Data

US 2016/0040850 A1    Feb. 11, 2016

(51) Int. Cl.
| | | |
|---|---|---|
| F21V 8/00 | (2006.01) | |
| F21V 7/00 | (2006.01) | |
| F21S 8/10 | (2006.01) | |
| F21W 101/12 | (2006.01) | |
| F21Y 113/00 | (2006.01) | |

(52) U.S. Cl.
CPC ............ *F21S 48/225* (2013.01); *F21S 48/215* (2013.01); *F21S 48/2206* (2013.01); *F21S 48/234* (2013.01); *F21W 2101/12* (2013.01); *F21Y 2113/005* (2013.01)

(58) Field of Classification Search
None
See application file for complete search history.

(56) References Cited

U.S. PATENT DOCUMENTS

| | | | |
|---|---|---|---|
| 4,929,866 A | 5/1990 | Murata et al. | |
| 5,590,945 A * | 1/1997 | Simms | 362/623 |
| 7,410,280 B2 | 8/2008 | Erber | |
| 7,548,670 B2 | 6/2009 | Ijzerman et al. | |
| 7,731,402 B2 | 6/2010 | Tessnow et al. | |
| 8,393,773 B2 * | 3/2013 | Lea | 362/560 |
| 2003/0123262 A1 * | 7/2003 | Suehiro et al. | 362/555 |
| 2006/0104076 A1 | 5/2006 | Erber | |
| 2008/0252986 A1 | 10/2008 | Ijzerman et al. | |
| 2008/0259620 A1 * | 10/2008 | Oba et al. | 362/487 |
| 2009/0034278 A1 | 2/2009 | Tessnow et al. | |
| 2009/0091944 A1 * | 4/2009 | de Lamberterie | 362/516 |
| 2011/0216549 A1 * | 9/2011 | Futami | 362/516 |
| 2012/0243249 A1 * | 9/2012 | Ohno | 362/518 |
| 2014/0092601 A1 | 4/2014 | Orisich et al. | |
| 2014/0226359 A1 * | 8/2014 | Erdl et al. | 362/553 |

FOREIGN PATENT DOCUMENTS

| | | |
|---|---|---|
| DE | 102011009100 A1 | 3/2012 |
| DE | 102010061210 A1 | 6/2012 |
| EP | 1895228 A1 | 3/2008 |
| EP | 2338732 A1 | 6/2011 |
| FR | 2934353 A1 | 1/2010 |
| WO | 2004042271 A2 | 5/2004 |
| WO | 2006096467 A2 | 9/2006 |
| WO | 2007054848 A1 | 5/2007 |

* cited by examiner

*Primary Examiner* — Ashok Patel
(74) *Attorney, Agent, or Firm* — Jacox, Meckstroth & Jenkins

(57) ABSTRACT

An apparatus for producing light signals in a vehicle. The same physical apparatus produces light signals of two different colors. Light emitting diodes (LEDs) of two different colors produce diverging light rays. These rays are captured by a transparent plate and conducted to an edge of the plate, which reflects and collimates the light into parallel beams. The parallel beams then reach an elongated lens running along another edge of the plate, which focuses, or de-focuses, the light and transmits it externally as a signal.

21 Claims, 16 Drawing Sheets

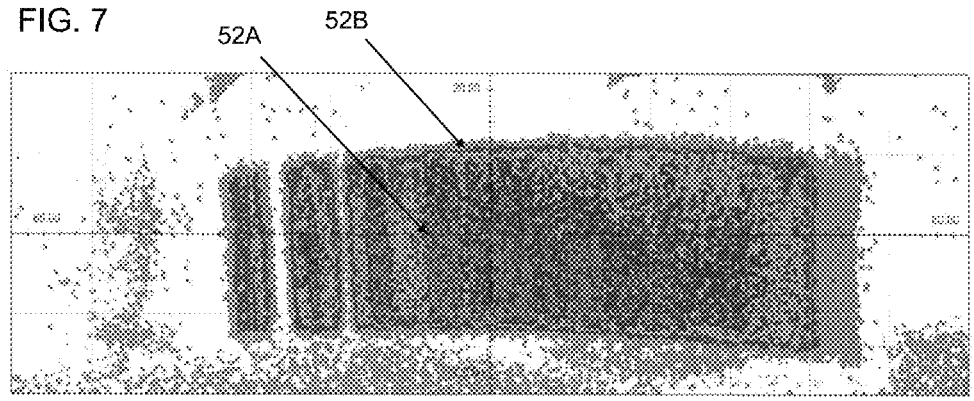
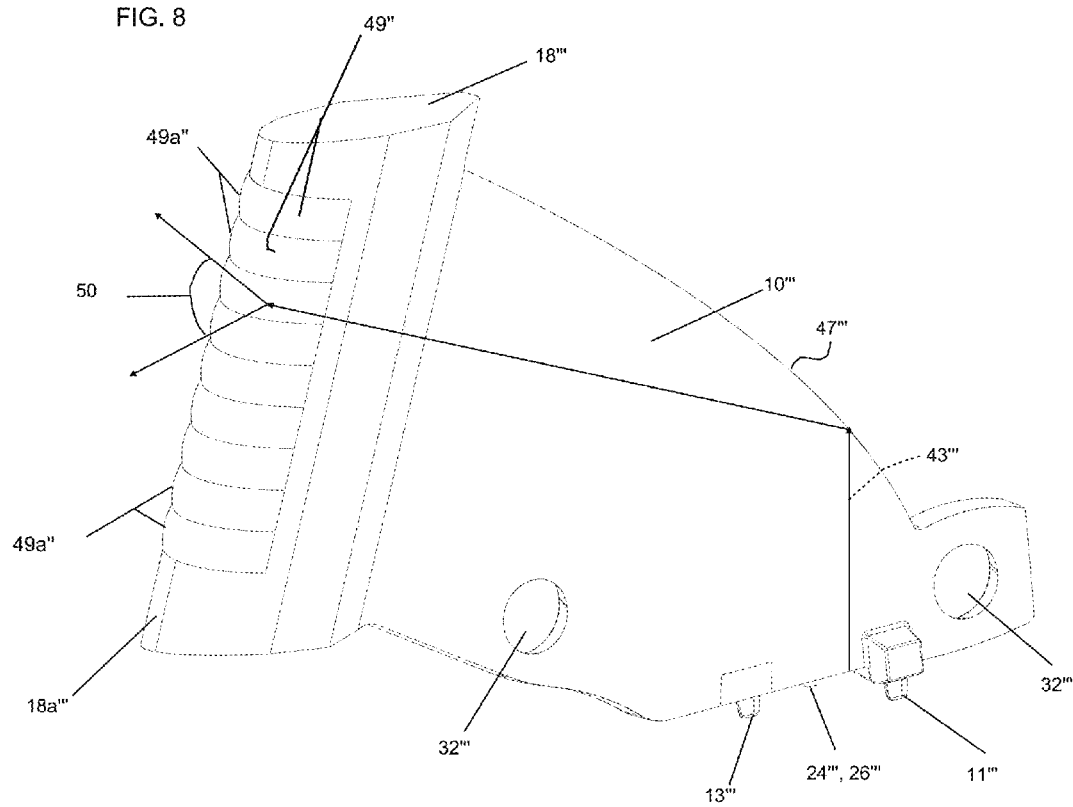

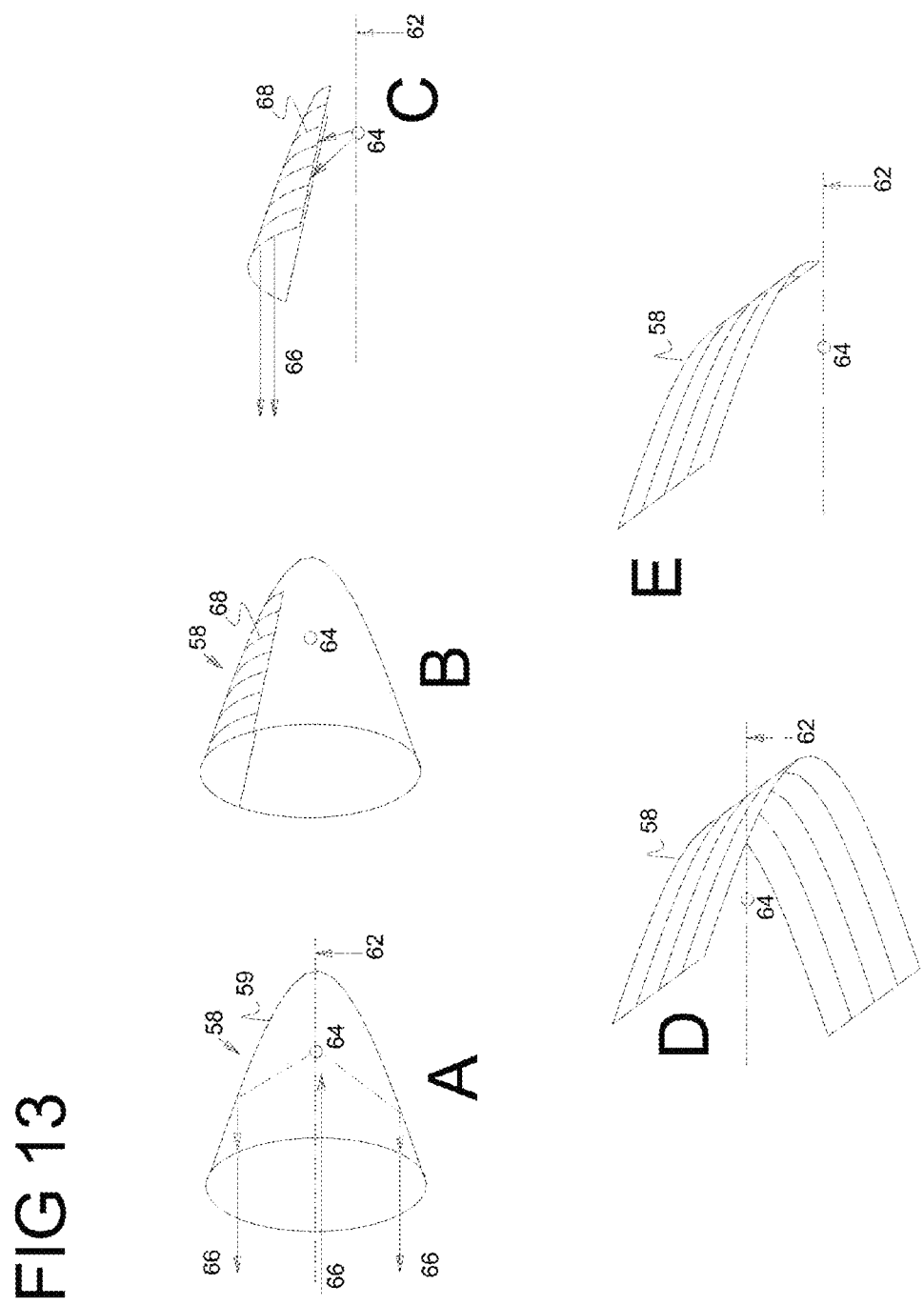

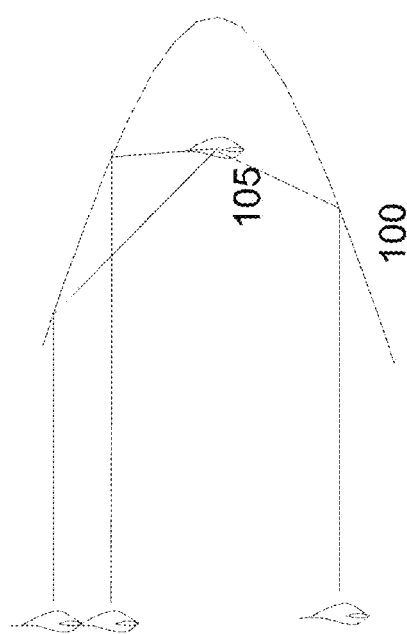
FIG 15
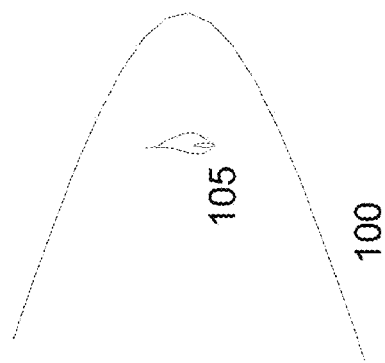
FIG 14

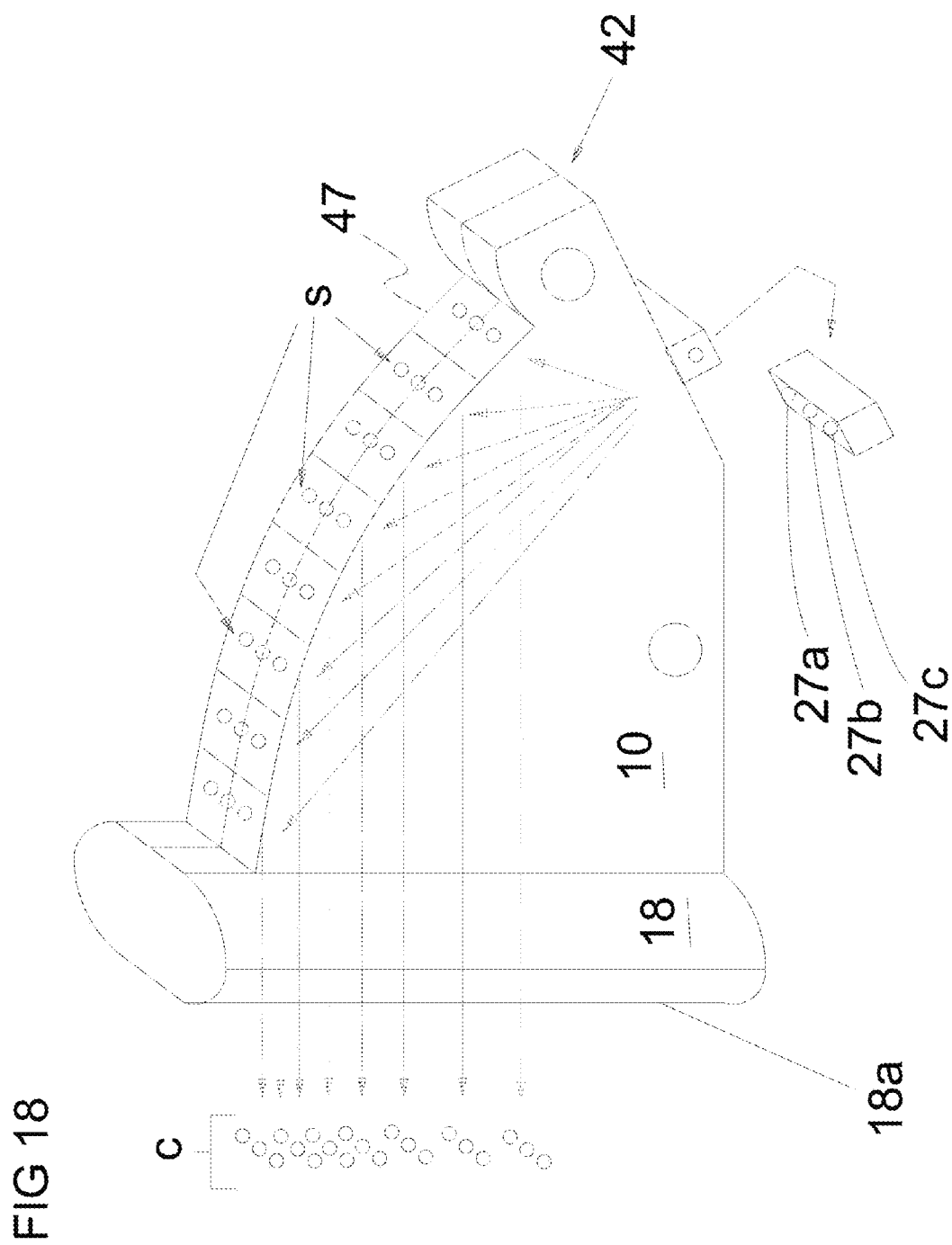

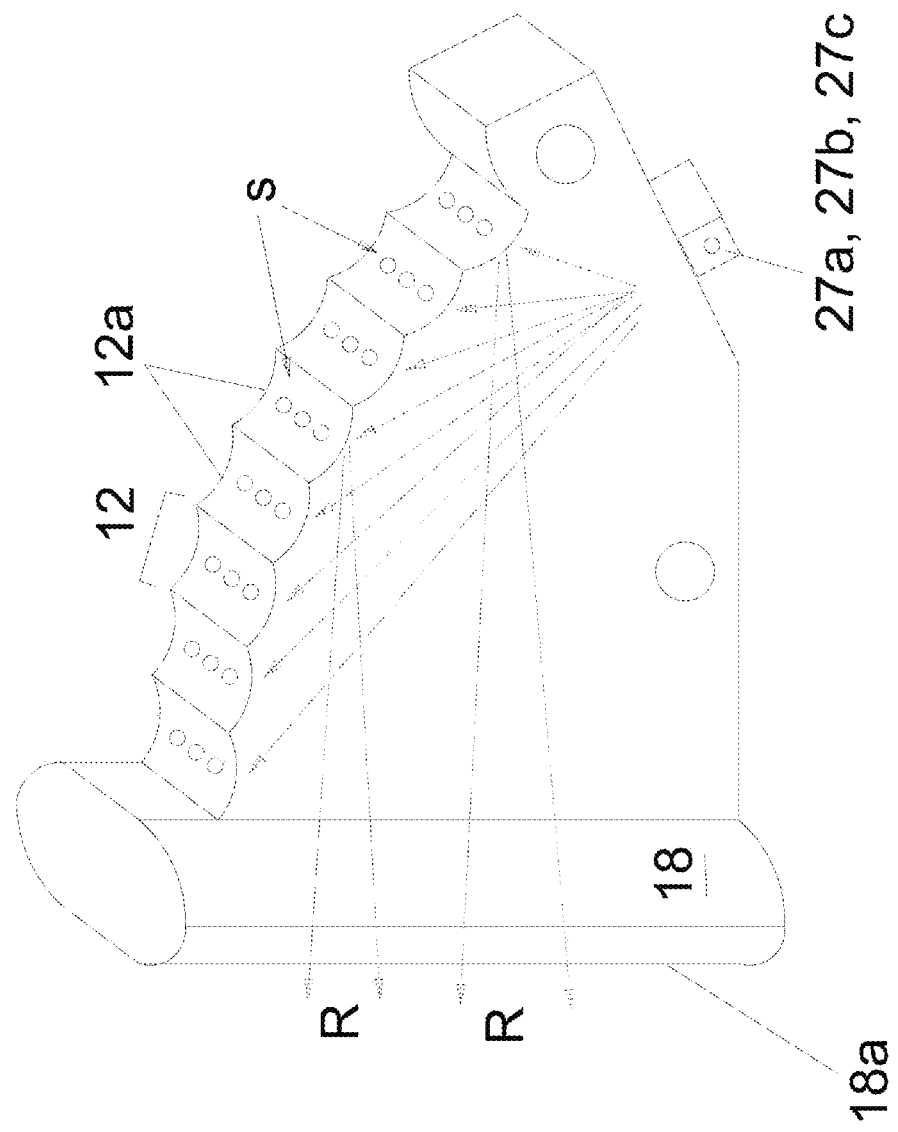

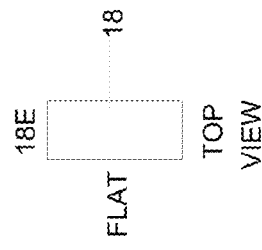
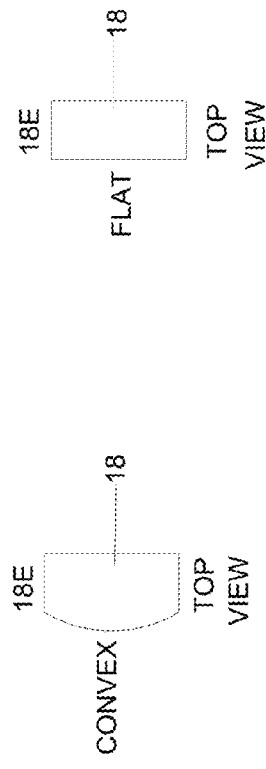
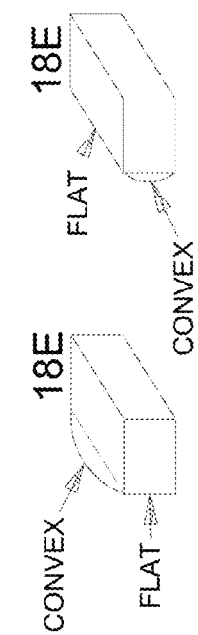
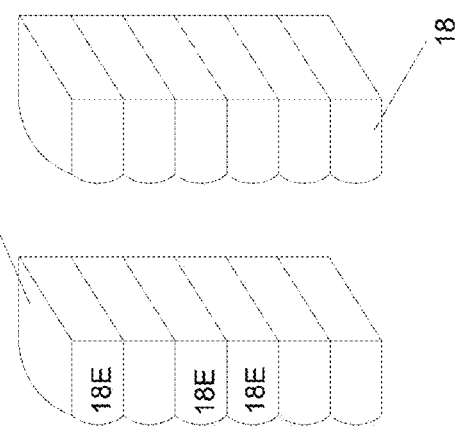
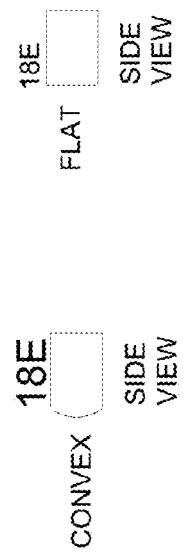

LIGHTING AND/OR SIGNALING DEVICE HAVING IMPROVED LIGHT EFFICIENCY AND DUAL COLOR FUNCTION

BACKGROUND OF THE INVENTION

1. Field of the Invention

This invention relates to a lighting and/or signaling device having improved light efficiency and/or dual color function.

2. Description of the Related Art

One prior art lighting or signaling devices is known from the patent application WO 2006/096467, which is related to U.S. Provisional Application 60/658,459, and which is incorporated herein by reference. This document discloses a lighting device that comprises a ray guide in the form of solid pieces that are tricky and expensive to produce. Performance in terms of range is reduced because of only moderately satisfactory collimation. In addition, the dimensions of the whole are relatively large.

In general, many light guide technologies for signal functions have poor efficiency and often require a large number of LEDs to produce a desired lit area. In addition, these prior art technologies are either single function or have multi-functions, but the lit aspect for different colors is different.

Current high-efficiency light guides are intended for forward lighting applications and typically have a single source and a single lit aspect.

What is needed, therefore, is a lighting and/or signaling device having improved efficiency and that is capable of providing multiple functions and that provides the same or substantially the same aspect even though different colored light sources are used in the device.

SUMMARY OF THE INVENTION

One object of an embodiment of the invention is to provide a high efficiency lighting and/or signaling device having a light guide for use with multiple functions, such as signaling functions, daytime running light (DRL) functions, headlamp or tail lamp functions and the like.

Another object of an embodiment is to provide a high efficiency light guide that can produce dual color signal functions with a higher efficiency than traditional light guides.

Still another object is to provide a high efficiency light guide that can produce dual or multi-color signal function with a higher efficiency than traditional light guides with no significant differentiation between light aspects of each function.

Yet another object is to provide a light guide that has the ability to create a large lit area with fewer LEDs.

Still another object is to provide a high efficiency light guide that comprises a unique styling appeal different from light guides of the past.

Another object is to provide a light guide system that is flexible enough to provide for all external lighting functions for a vehicle, including but not limited to forward lighting (high beam, low beam, fog and the like), and other lighting such as turn signal lighting and daytime running light (DRL) function.

Some further objects and advantages of the invention include:
  a light guide having high efficiency compared to prior art light guides;
  consistent lit aspect for different functions and different colors;
  consistent lit aspect across the exit face of the light guide;
  a larger lit area per light emitting diode (LED) compared to prior art light guides;
  styling interest and flexibilities;
  improved manufacturing capabilities and mold flow in at least one embodiment by providing an air gap in a lens of the light guide.

In one aspect, one embodiment comprises a lighting and/or signaling device having a light guide that utilizes a plurality of flutes or facets on a reflective edge of the light guide. A definition of the plurality of flutes or facets on the reflective edge of the light guide and definition of a front face of the light guide controls light spread and can be tuned depending on a specific signal function application.

In another embodiment, a lighting and/or signaling device having a light guide has a lens that having an interior wall that defines an aperture or cavity. A plurality of flutes or facets are situated on at least a portion of the interior wall and the flutes or facets control a spread of the light. The cavity defines an air gap between light leaving a rear edge of a portion of the light guide and light leaving a front face of a lens of the light guide. A definition and dimensions of the air gap can be used to affect the beam pattern provided by the light guide.

In yet another aspect, a plurality of flutes or facets are provided on front face of the light guide, such as on a lens of the light guide. The front face plurality of flutes or facets control light spread and can be tuned depending upon specific signal function application.

In yet another embodiment, a plurality of flutes or facets are provided on the light guide such as on a reflective surface of the light guide and are tuned or focused onto a predetermined light source, such as a light source having one or more LEDs. Thus, a first set of the plurality of facets or flutes can be focused on a first light source and a second set of plurality of facets or flutes can be focused on a second light source.

In another embodiment, the plurality of flutes can be convex surfaces, such as convex surfaces situated on a reflective edge of the light guide or they can be cylindrical, curved or concave if they are provided on an outer surface of the lens of the light guide.

In one aspect, one embodiment of the invention comprises a lighting assembly for a vehicle, comprising a light guide having a generally planar or sheet portion having an input face or edge and a reflective edge for reflecting light towards an exit surface or face of a lens, at least one light source for transmitting light, the at least one light source being operatively positioned relative to the input face or edge and transmitting light into the generally planar or sheet portion for reflection by the reflective edge toward the exit surface or face of the lens, and the light guide comprising a plurality of flutes or facets for controlling a spread and distribution of the light transmitted by the at least one light source.

In another aspect, another embodiment of the invention comprises a lighting and/or signaling device for a vehicle, comprising an optical system comprising a light guide having a generally planar or sheet portion and a lens having an exit surface or face visible from outside the vehicle, the optical system generating i) a first visual function on the exit surface or face of the lens when a first light source for producing light of a first color is illuminated, and ii) a second visual function on the exit surface or face of the lens when a second light source for producing light of a second color is illuminated, the first visual function and the second visual function being substantially identical.

This invention, including all embodiments shown and described herein, could be used alone or together and/or in combination with one or more of the features covered by one or more of the claims set forth herein, including but not limited to one or more of the features or steps mentioned in the following bullet list and the claims.

The lighting assembly wherein the reflective edge comprises the plurality of flutes or facets and reflects the light toward the exit surface or face of the lens.

The lighting assembly wherein the lighting assembly comprises a plurality of light sources for producing a plurality of colors selected to perform a plurality of different functions, respectively, each of the plurality of light sources being energized independently to cause the light guide to perform a plurality of different functions, respectively.

The lighting assembly wherein the plurality of different functions comprise a daytime running light function and a turn signal function, the plurality of light sources comprises at least one first LED that produces a white light for performing the daytime running light function and at least one second LED that produces an amber light for performing the turn signal function.

The lighting assembly wherein the reflecting edge is generally parabolic and each of the plurality of flutes or facets are convex with respect to the input face or edge.

The lighting assembly wherein the plurality of flutes or facets are aligned along a generally parabolic curve.

The lighting assembly wherein the plurality of flutes or facets are adapted to define at least one of a plurality of convex reflectors or a plurality of diverging lenses within a light path of light rays generated by the at least one light source to cause the light rays to diverge as they exit the exit surface or face of the lens.

The lighting assembly wherein the plurality of flutes or facets are adapted to define at least one of a plurality of convex reflectors or a plurality of diverging lenses within a light path of light rays generated by the plurality of light sources to cause the light rays to diverge as they exit the exit surface or face of the lens.

The lighting assembly and further comprising a plurality of convex reflectors, or diverging lenses, or both and along a light path within the lighting assembly, which cause the lens to display a visual image for each color of light, and the visual image produced by one of the colors is substantially identical to the visual image produced by the other color.

The lighting assembly wherein the plurality of flutes or facets define a plurality of lenses within a light path of light rays generated by the at least one light source to cause the to provide a predetermined beam pattern.

The lighting assembly wherein the plurality of flutes or facets define a plurality of lenses within a light path of light rays generated by the plurality of light sources to cause the light rays emitted by the plurality of light sources to be produced in a predetermined beam pattern.

The lighting assembly wherein the lens comprises an internal wall defining an aperture, at least a portion of the internal wall comprising the plurality of flutes or facets which define a plurality of lenses within a light path of light rays generated by the at least one light source.

The lighting assembly wherein the lens comprises an internal wall defining an aperture, at least a portion of the internal wall comprising the plurality of flutes or facets which define a plurality of lenses within a light path of light rays generated by the plurality of light sources.

The lighting assembly wherein the internal wall is generally U-shaped and defines a longitudinal opening or slot in the lens, the light rays from the at least one light source passing through the longitudinal opening or slot before they exit the exit surface.

The lighting assembly wherein the plurality of flutes or facets are located on the exit surface or face of the lens and define a plurality of lenses within a light path of light rays generated by the at least one light source.

The lighting assembly wherein the plurality of flutes or facets are located on the exit surface or face of the lens and define a plurality of lenses within a light path of light rays generated by the plurality of light sources.

The lighting assembly wherein the plurality of flutes or facets are tuned to at least one of the plurality of light sources.

The lighting assembly wherein the plurality of flutes or facets are tuned to only one of the plurality of light sources in order to produce the plurality of different functions.

The lighting assembly wherein the plurality of light sources comprises a first colored light source that generates a first colored light and a second colored light source that generates a second colored light that is different from the first colored light, the lighting assembly generates i) a first visual pattern on the exit surface or face of the lens when the first colored light source is illuminated, and ii) a second visual pattern on the lens when the second colored light source is illuminated, wherein the first and second visual patterns are substantially similar.

The lighting assembly wherein the plurality of flutes or facets are tuned to only one of the plurality of light sources in order to produce the plurality of different functions.

The lighting assembly wherein lighting assembly further comprises a cassette or holder for receiving the light guide to facilitate mounting the lighting assembly onto a vehicle.

The lighting assembly wherein the plurality of facets are each curved and at least one of a vertical plane or a horizontal plane with respect to the lens.

The lighting assembly wherein the plurality of facets or flutes are curved in both a vertical plane and a horizontal plane with respect to an axis of the lens.

The lighting and/or signaling device wherein the first color is a white light and the first visual function is a daytime running light.

The lighting and/or signaling device wherein the second color is an amber light and the second visual function is a turning signal light.

The lighting and/or signaling device wherein the optical systems further comprises a plurality of flutes or facets for controlling a spread and distribution of the light transmitted by the first and second light sources.

The lighting and/or signaling device wherein the generally planar or sheet portion comprises a reflecting edge that is curved or generally parabolic, the plurality of flutes or facets being located on the reflecting edge, and a plurality of flutes or facets are convex with respect to an input face or edge.

The lighting and/or signaling device wherein the plurality of flutes or facets are adapted to define at least one of a plurality of convex reflectors or a plurality of diverging lenses within a light path of light rays generated by the first and second light sources to cause the light rays to diverge as they exit the exit surface or face of the lens.

The lighting and/or signaling device wherein the plurality of flutes or facets define a plurality of lenses within a light path of light rays generated by first and second light sources to cause the light rays emitted by the first and second light sources to be produced in a predetermined beam pattern.

The lighting and/or signaling device wherein the lens comprises an internal wall defining an aperture, at least a portion of the internal wall comprising the plurality of flutes or facets which define a plurality of lenses within a light path of light rays generated by the first and second light sources.

The lighting and/or signaling device wherein the first visual function provides an aspect that is substantially the same as an aspect of the second visual function.

The lighting and/or signaling device wherein the second color is an amber light and the second visual function is a turning signal light.

The lighting and/or signaling device wherein the internal wall is generally U-shaped and defines a longitudinal opening or slot in the lens, the light rays from the first and second light sources passing through the longitudinal opening or slot before they exit the exit surface or face of the lens, the longitudinal opening being generally parallel to and exit surface or face of the generally planar or sheet portion.

The lighting and/or signaling device wherein the plurality of flutes or facets are located on the exit surface or face of the lens and define a plurality of lenses within a light path of light rays generated by the first and second light sources.

The lighting and/or signaling device wherein each of the plurality of flutes or facets are tuned or focused to only one of either the first light source or the second light source.

The lighting and/or signaling device wherein the lighting and/or signaling device generates i) a first visual pattern on the exit surface or face of the lens when the first light source is illuminated, and ii) a second visual pattern on the lens when the second light source is illuminated, wherein the first and second visual patterns are substantially similar.

The lighting and/or signaling device wherein the lighting and/or signaling device further comprises a cassette or holder for receiving the light guide to facilitate mounting the lighting and/or signaling device onto a vehicle.

These and other objects and advantages of the invention will be apparent from the following description, the accompanying drawings and the appended claims.

BRIEF DESCRIPTION OF THE ACCOMPANYING DRAWINGS

Figure 1:
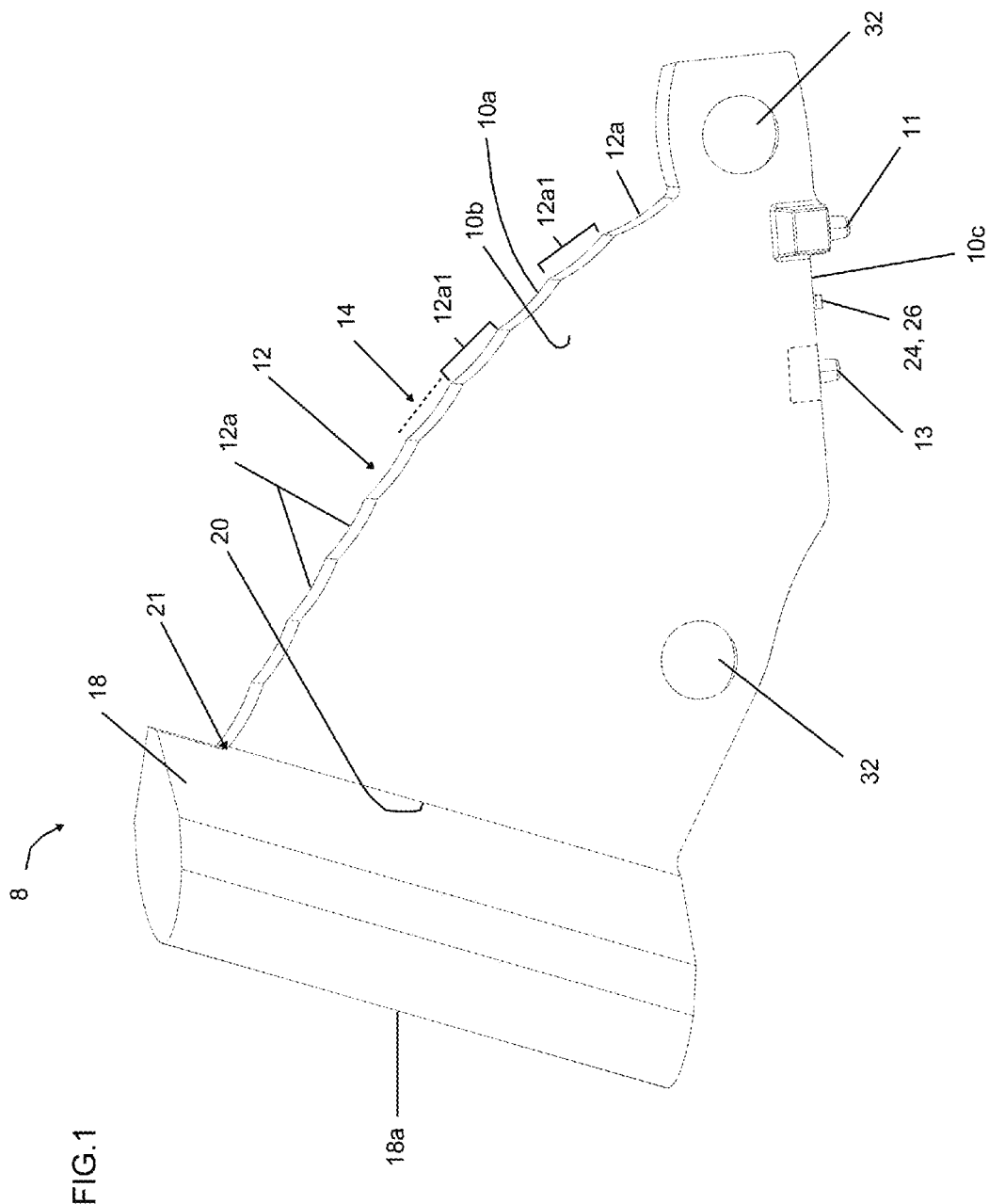
FIG. 1 illustrates one form of a light guide and facets in accordance with one form of the invention.
Figure 3A:
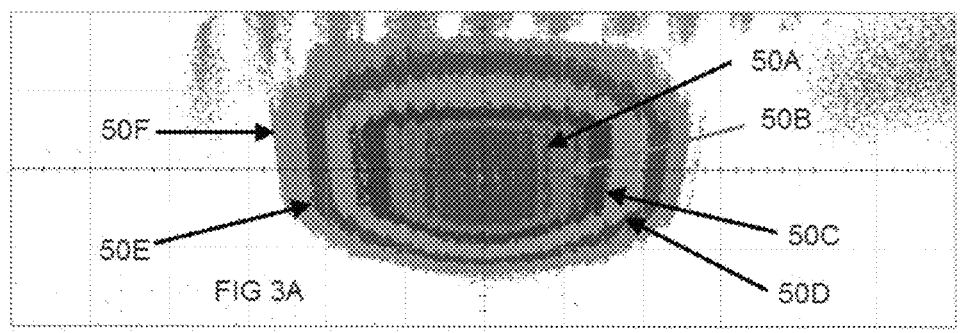
Figure 3B:
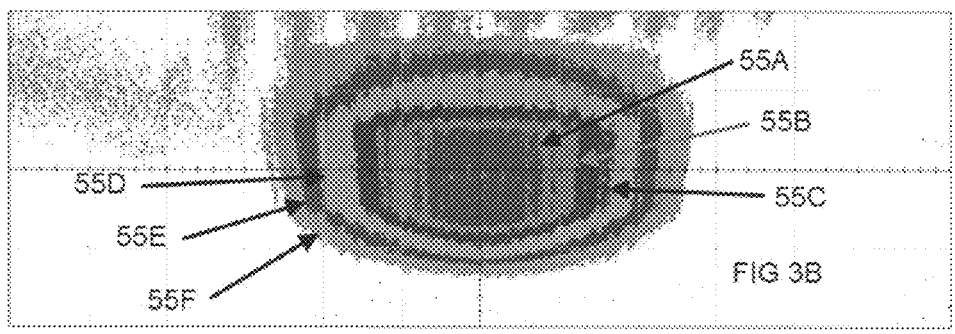
Figure 4:
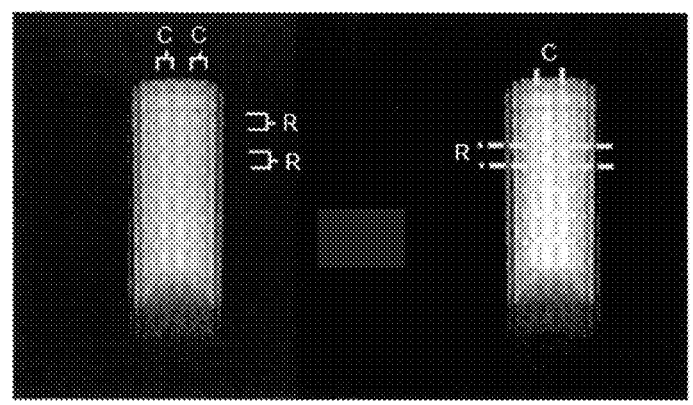
Figure 5:
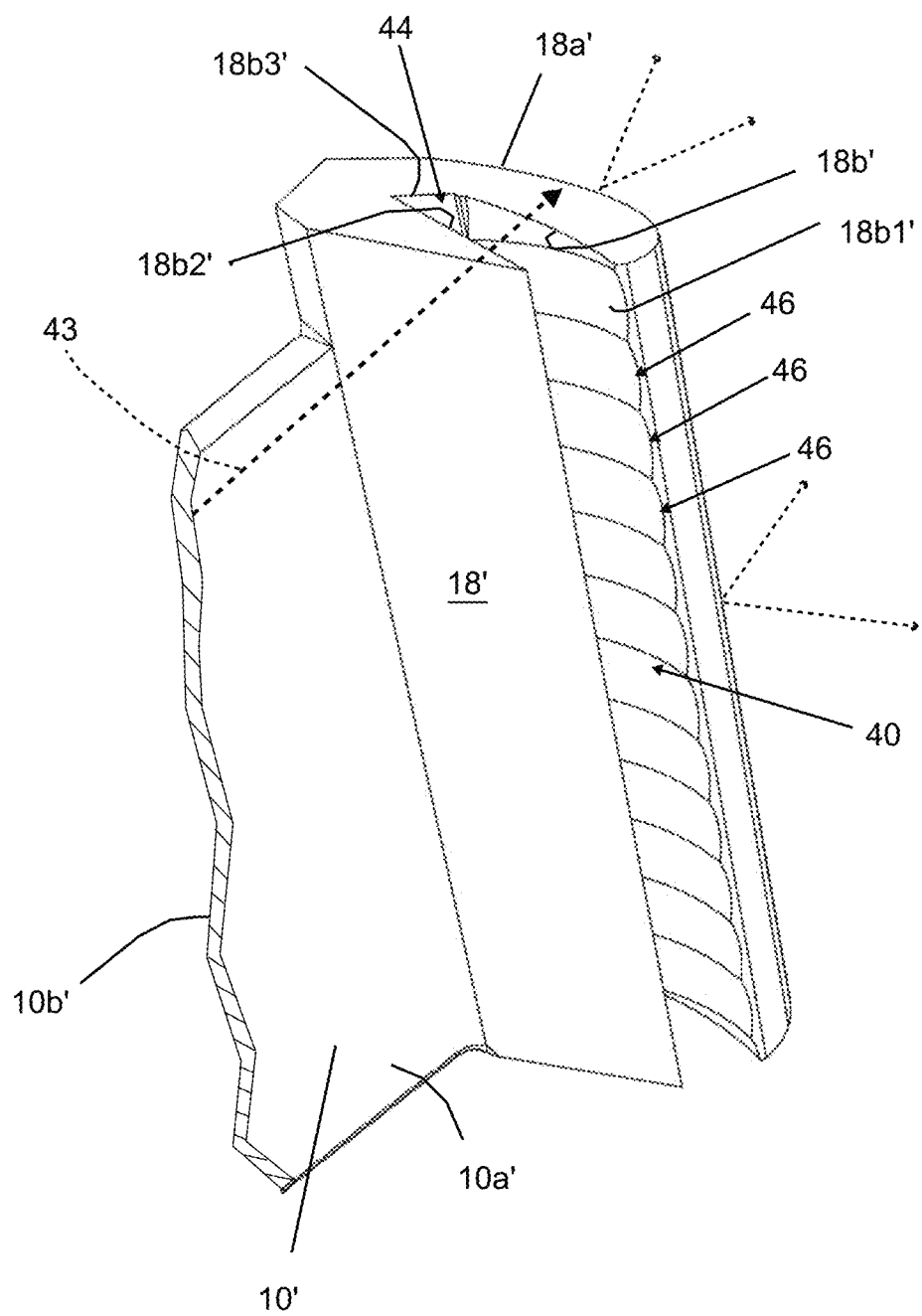
Figure 6:
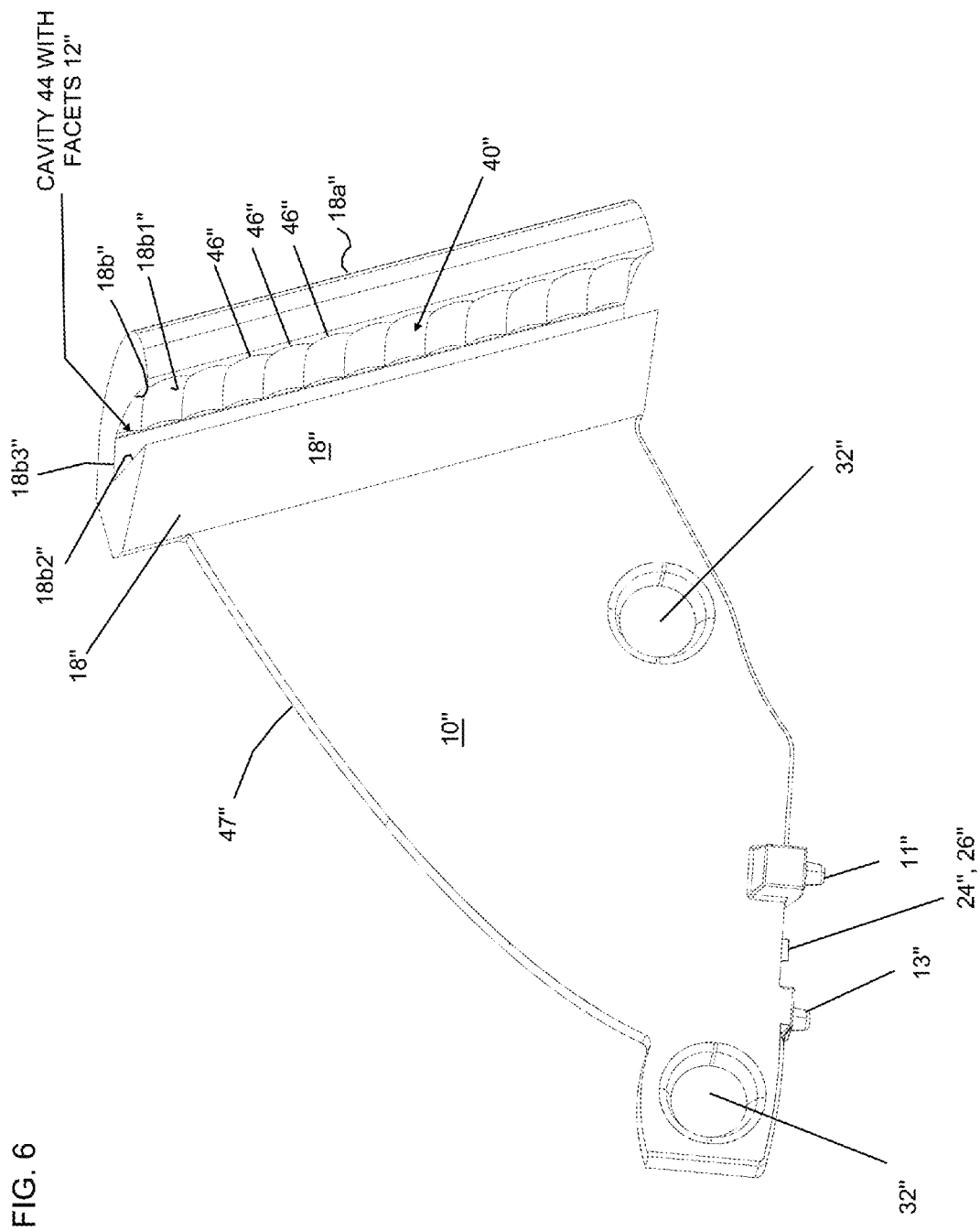
Figure 9:
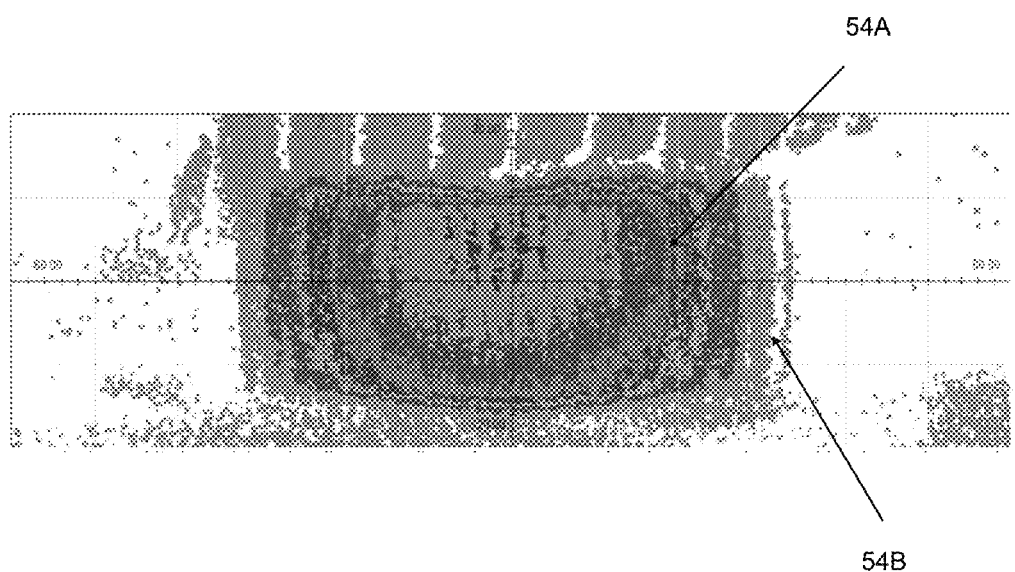
Figure 10:
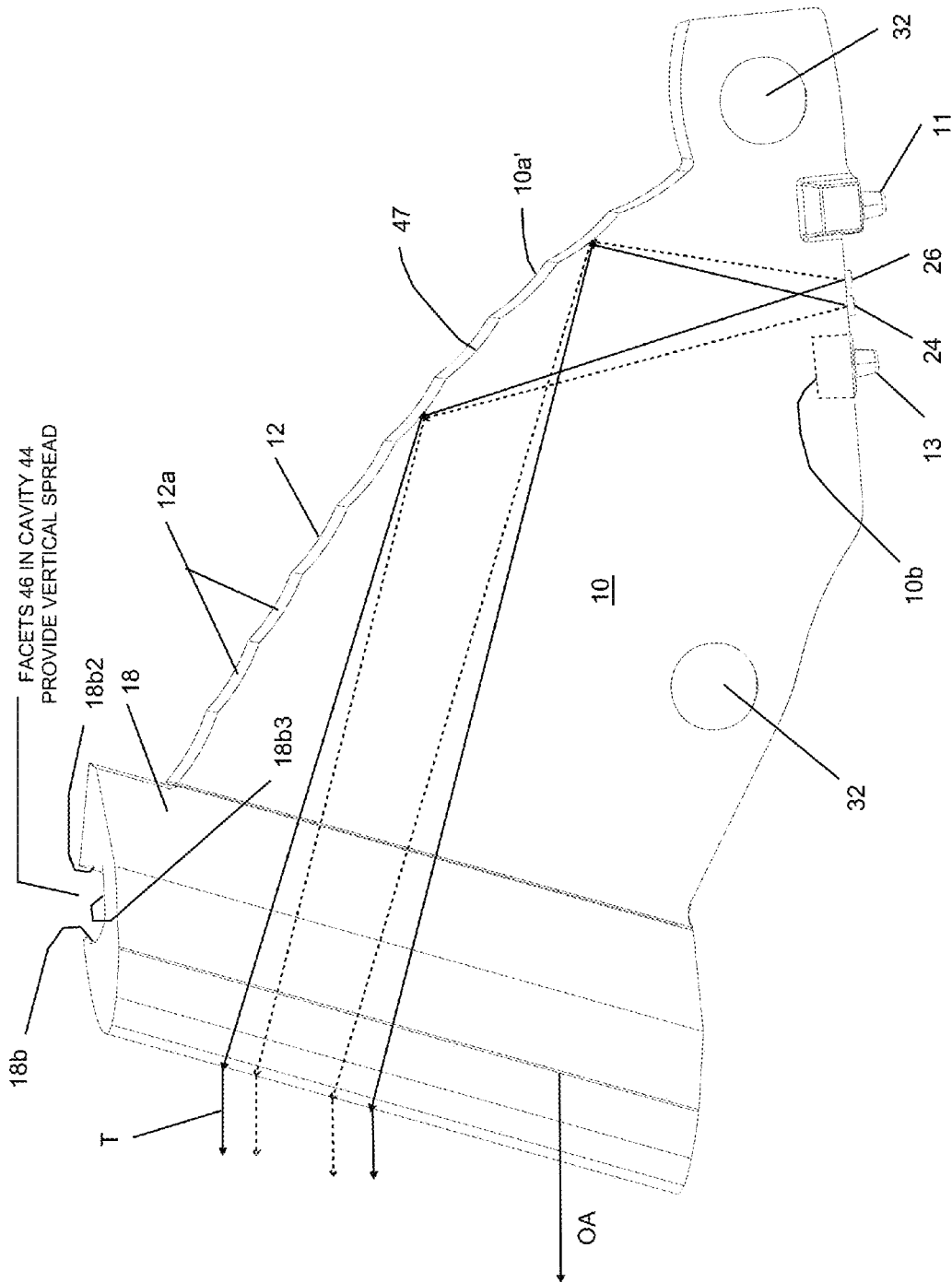
Figure 11:
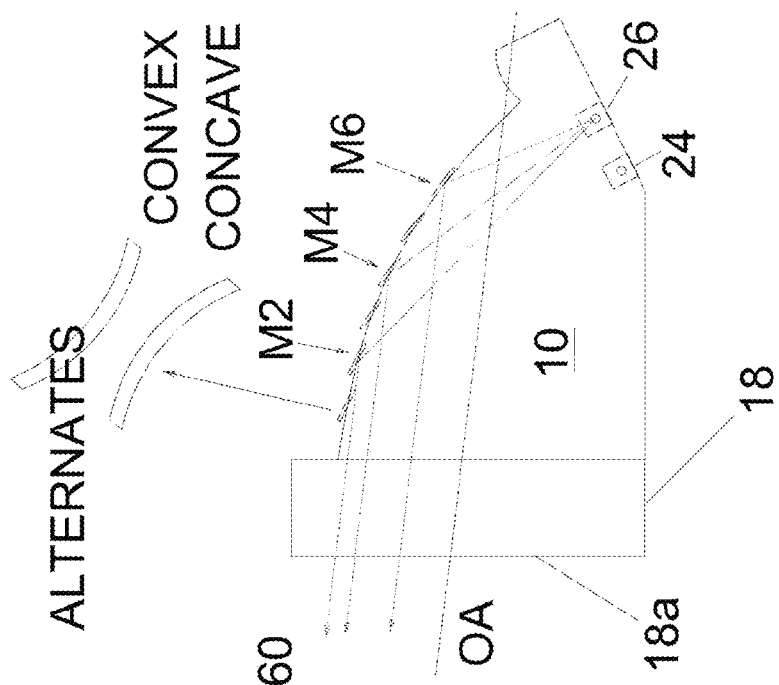
Figure 12:
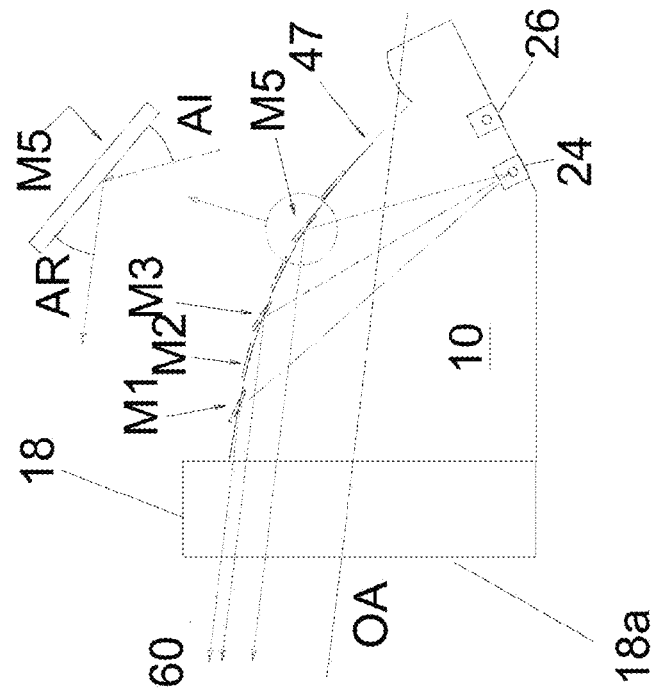
Figure 16:
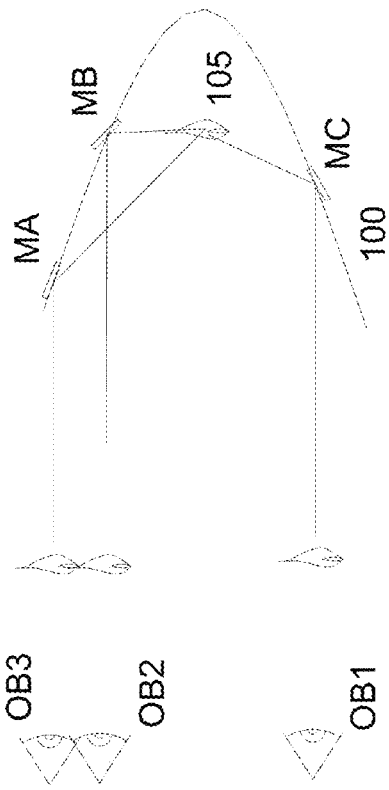
Figure 17:
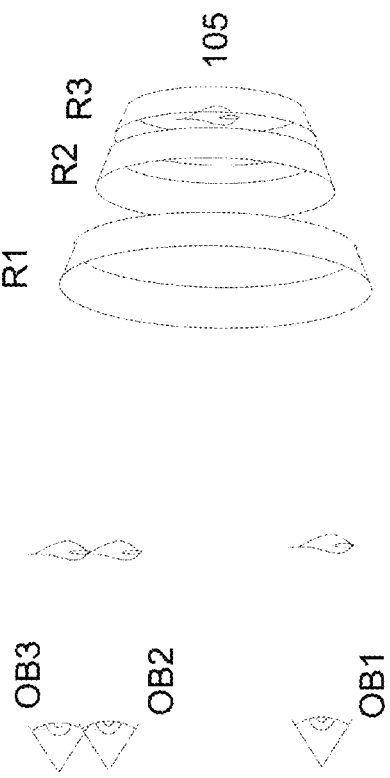
Figure 26:
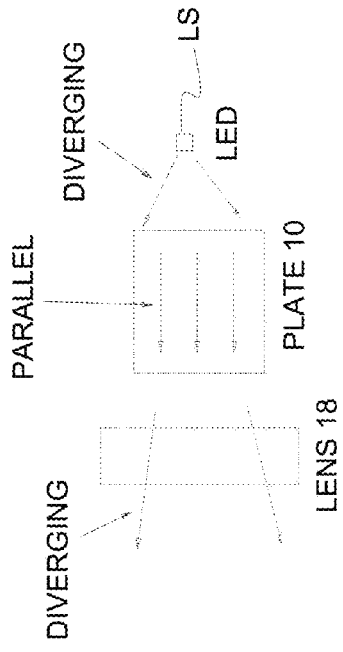
Figure 27:
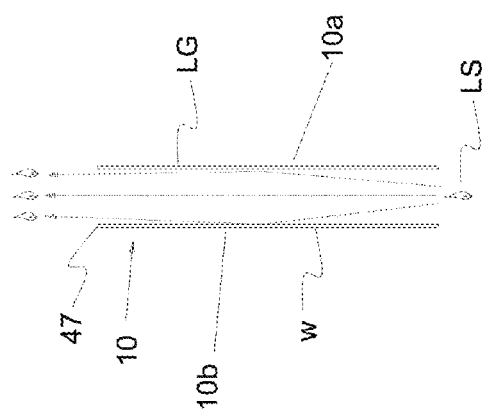

FIGS. 3A, 3B, and 4 illustrate optical patterns generated by one form of the invention;

FIG. 5 illustrates one form of the invention, in which a lens of the light guide contains a cavity;

FIG. 6 illustrates one form of the invention in which the lens of FIG. 5 is installed onto or integral with the plate of FIG. 1;

FIG. 7 illustrates an optical pattern produced by the apparatus of FIG. 6;

FIG. 8 illustrates another form of the invention;

FIG. 9 illustrates an optical pattern produced by the apparatus of FIG. 8;

FIG. 10 illustrates another form of the invention;

FIGS. 11 and 12 illustrate one conception or illustration of the operation of the embodiment shown in FIG. 10;

FIGS. 13-18 provide one conception or illustration of how the image, such as that of FIG. 4, is generated. FIG. 13 illustrates development of an off-axis paraboloid reflector;

FIGS. 14 and 15 illustrate how a parabolic mirror can generate multiple images for multiple observers;

FIGS. 16 and 17 illustrate how the parabolic reflector, viewed by multiple observers, can be viewed as individual mirrors;

FIG. 18 applies the conceptions developed in FIGS. 13-17;

FIG. 19 illustrates facets producing diverging rays;

FIG. 20 illustrates how the lens in FIG. 1 can be viewed as a stack of individual lens elements;

FIGS. 21 and 22 are top views of two different elements, one having a convex external face, and the other having a flat front face;

FIGS. 23 and 24 are side views of two different elements, one having a convex external face, and the other having a flat front face;

FIG. 25 is a composite view of the four elements of FIGS. 21-24, but shown in perspective;

FIG. 26 illustrates how the plate of FIG. 1 can be viewed as a waveguide, and generates multiple images;

FIG. 27 illustrates operation of one form of the invention; and

Figure 28:
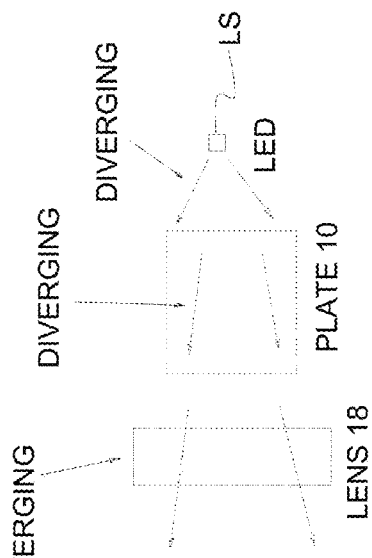

FIG. 28 illustrates a different mode of operation of one form of the invention.

DETAILED DESCRIPTION OF THE PREFERRED EMBODIMENTS

FIG. 1 illustrates one form of the invention in the form of a light guide and light guide system 8. A transparent plate or sheet 10, constructed of a plastic resin, such as a polycarbonate, contains a generally curved or parabolic edge 12 into which are formed generally curved or concave facets or flutes 12a. The faces 12a1 of the facets or flutes 12a of edge 12 are directed inward, toward the interior of the plate or sheet 10. The plate or sheet 10 is generally planar and has a first side or wall 10a and a second side or wall 10b which is generally parallel and opposes the first side or wall 10a. The facets or flutes 12a of facet or edge 12 bear a metalized or other reflective coating, which is illustrated by dashed line 14.

An elongated lens 18 is attached to or integrally molded with another edge 20 of the plate or sheet 10. The edge 20 defines an exit edge or transmitting edge in one embodiment. The two edges 12 and 20 meet at a vertex 21. The lens 18 comprises a generally convex exit face 18a facing outward as illustrated in FIG. 1. In some embodiments, this exit face 18a can be generally arcuate or even cylindrical.

Figure 2:
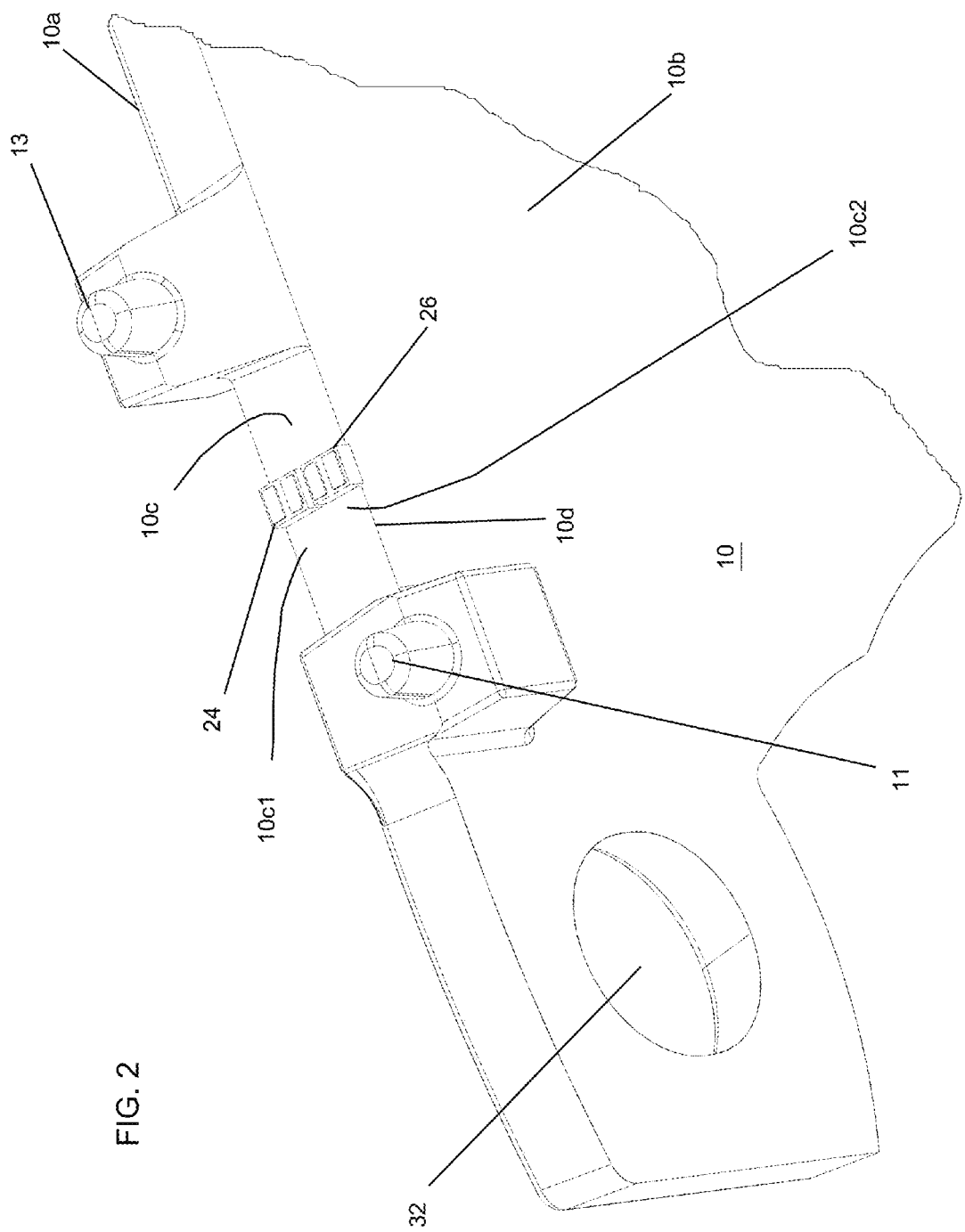
FIG. 2 illustrates positioning of the LEDs of FIG. 1.

As best shown in FIG. 2, two sets of light sources in the form of light emitting diodes or LEDs 24 and 26 emit or project light into an inlet or input edge 10c of the plate or sheet 10. LED 24 preferably produces white light and LED 26 produces light of another color, such as amber light. In the illustration being described, only one LED 24, 26 is illuminated at a time. In this example, the LEDs 24 and 26 are in generally opposed relationship to the inlet or input edge 10c of the plate or sheet 10. FIG. 2 shows the LEDs mounted on the inlet or input edge 10c of the plate or sheet 10 in FIG. 1.

The plate or sheet 10 comprises a plurality of conventional aligning or mounting projections 11 and 13 (FIG. 2) for facilitating mounting the light guide and system 8 onto a light assembly (not shown) or a housing or cassette that will be mounted in the light assembly, which may be a headlamp or tail light assembly. In one form of the invention, the plate or sheet 10 in FIG. 1 is attached to a housing, holder or cassette, such as the cassette shown in U.S. Patent Publication No. 2014/0092601, and mounted on a vehicle (not shown) by means of bolts (not shown) which engage holes 32. This application is owned by the same Assignee as the present application and is incorporated herein by reference.

As shown in FIG. 2, the LEDs 24 and 26 can be mounted directly on and in opposed relation to inlet or input edge 10c side-by-side, that is, with one LED (such as LED 24) closer to a first portion 10c1 of the inlet or input edge 10c (FIG. 2) of the plate or sheet 10 coupled to the other LED (such as LED 26) closer to a second portion 10c2 (FIG. 2). Also, the LEDs 24, 26 can be mounted in tandem, as indicated by LEDs 24 and 26 in FIG. 2, in which case they would both be equidistant from the inlet or input edge 10c of the plate or sheet 10.

Alternatively, the LEDs 24, 26 can be mounted at different distances from their respective first and second portions 10c1 and 10c2, respectively.

In FIG. 1, the plate or sheet 10 comprises a plurality of holes 32 that accommodate bolts (not shown) for mounting the plate or sheet 10 to a cassette, housing or light assembly (not shown) that is mounted on a vehicle (not shown).

FIG. 3A is a computer simulation of light produced or emitted by the apparatus of FIG. 1, but when the LEDs 24 and 26 are positioned as in FIG. 2 and the white LED 24 only is illuminated. The corresponding efficiency of FIG. 3A is found to be about forty-five percent (45%). Efficiency refers to the percentage of light transmitted from the LEDs 24 and 26 and through an exit face 18a of the lens 18 in FIG. 1, as a percentage of the light produced by the LEDs 24 or 26, respectively.

In FIG. 3A, the shaded areas 50A-50F indicate areas of different brightness or different intensity with area 50A being the brightest, and diminishing to area 50F, which is the least bright.

FIG. 3B is a similar simulation, but when the amber LED 26 is illuminated. Efficiency is again about forty-five percent (45%). Shaded areas 55A-55F indicate relative brightness, as in FIG. 3A.

It is pointed out that the visual images of FIGS. 3A and 3B are very similar and may appear identical to an average observer who is not a designer of automotive lighting, despite the fact that one image is white and the other is amber in color. However, the images are different as will be explained herein relative to FIG. 4.

FIG. 4 is a photograph viewing the exit face 18a of the lens 18 of FIG. 1, with two types of illumination. The image on the left side is produced when the amber LED 26 is illuminated, and the image on the right side of FIG. 4 is produced when the white LED 24 is illuminated. It is again pointed out that the two images are virtually identical. For ease of understanding, the images of FIG. 4 can be conceptually divided into rows R and columns C, as indicated by those symbols in the Figure.

FIGS. 5 and 6 are other embodiments. In these embodiments, like part numbers are identified with the same part numbers, except that one or more prime marks (') have been added to the part numbers in FIGS. 5 and 6. FIG. 5 illustrates a modification of the lens 18 in FIG. 1. A plate or sheet 10' is shown. An interior generally U-shaped wall 18b' defines a generally U-shaped cavity 40 that forms an air gap 44 in an optical path 43. The wall 18b' comprises a first portion 18b1', a second portion 18b2; and a joining portion 18b3' that joins the first and second portions 18b1' and 18b2'. A plurality of facets or generally curved surfaces 46 are formed on the first portion 18b1' of the wall 18b'. The plurality of facets or generally curved surfaces 46 are concave toward incoming light and thus cause light exiting the lens 18' to diverge vertically while the exit face 18a (FIG. 1) and 18a' (FIGS. 5 and 6) diverge horizontally. The presence of the cavity 40 simplifies molding operations and also reduces tooling complexity, as well as reducing the amount of material required to construct the lens 18'.

FIG. 6 illustrates the lens 18" of FIG. 5 attached or integrally molded with plate or sheet 10", but in which edge 47" takes the form of a parabola, without the facets or flutes 12a shown in FIG. 1. Thus, the facets or flutes 12a of FIG. 1 are absent from edge 10a". FIG. 7 is a computer simulation of the light pattern or image produced by the lens 18" by this apparatus. Areas 52A are areas of brighter luminosity and areas 52B are areas of lower luminosity.

FIG. 8 illustrates still another embodiment in which the cavity or air gap 44 of FIG. 5 is eliminated and the curved surfaces 46" are also eliminated. However, in FIG. 8, a plurality of edges 49" are provided or integrally formed on the outer surface 18a''' of the lens 18'''. The plurality of edges 49" is convex and faces outward relative to the light rays 43". The cross-sectional shape of outer surfaces 49a" and shape of outer surface 18a''' of the edge 47 cause the light rays 43''' to exit through the plurality of edges 49" and diverge vertically and horizontally.

FIG. 9 is a computer simulation of light produced by the apparatus of FIG. 8. Regions 54A indicate brighter areas, while regions 54B indicate darker areas. The spread of illumination is wide, both horizontally and vertically, which makes the apparatus suitable for signaling. Efficiency is again about forty-five percent (45%).

FIG. 10 illustrates another form of the invention, which causes transmitted rays T to be transmitted along or parallel to an optical or projection axis OA. The device of FIG. 10 is designed to accommodate the fact that the LEDs 24 and 26 will not occupy the same physical location, as will now be explained by simulation.

FIGS. 11 and 12 shows six mirrors M1-M6 running along edge 47. These mirrors M1-M6 are shown to illustrate the inventive concepts. In FIG. 11, six mirrors are shown, but that is illustrative only, as the reflective edge 47 may provide either an infinite or a finite number of reflective surfaces. A larger number can be used. Also, the mirrors need not be flat, as shown, but can be concave or convex, as the image labeled "alternates" in FIG. 12 indicates. The FIGS. 11 and 12 are provided to facilitate understanding of the optical or reflective effect that the shape of the reflective edge 12a has on the light rays emitted by the LEDs 24 and 26. Three of the reflectors or mirrors M1, M3, and M5 receive light from the white LED 24, as indicated. Those three mirrors M1, M3, and M5 are positioned so that the reflected light rays 60 are generally parallel to the projection axis OA. For example, in FIG. 11, mirror M5 is shown in exploded and enlarged format. It is arranged so that the angle of incidence AI generally equals the angle of reflection AR, to make the reflected light ray 60 follow the projection axis OA.

Similarly, in FIG. 12, the light from the amber LED 26 is reflected by the remaining mirrors M2, M4, and M6. Again, the angle of incidence is generally equal to the angle of reflection to generally align the reflected light rays 60 with the projection axis OA.

This discussion will present a simplified explanation of some operative principles utilized by the invention and some modifications based on those principles.

It was stated above that edge 47 in FIG. 6 is generally parabolic. A more precise description would be an off-axis paraboloid, as will now be explained. FIG. 13, image A, illustrates a paraboloid 58, which is created or defined by a parabola 59, which is a two-dimensional geometric form, that is revolved about an axis 62. Light which emanates from the focal point 64 is reflected outward as parallel rays 66.

FIG. 13, image B, shows a sector or section 68 (drawn hatched) of a portion of the paraboloid 58. If that section 68 is removed and isolated, as in image C, the result is an off-axis paraboloid. It is off-axis because it does not intersect the axis 62 in image A. Nevertheless, the sector or section 68 in image C reflects rays 66 in a manner similar to that of image A.

One benefit of the off-axis arrangement is that any physical objects located at the focal point 64, such as a transmitting LED or an optical receiver (neither are shown for ease of illustration) will not obstruct incoming rays. That is, an object (not shown) present at focal point 64 in image A will block ray 66. In contrast, an object (not shown) present at focal point 64 in image C will not block any rays parallel to the axis 62 reaching the section 68.

In another embodiment, the parabolic edge 47 in FIG. 6 is not an off-axis paraboloid, but can be an extrusion of a parabola, as shown in images D and E in FIG. 13. Image D shows the paraboloid 58, but extruded parallel to itself into an imaginary three-dimensional surface. Image E shows that surface truncated, so that it does not intersect the axis 62.

It is not required that the reflecting surface or edges (e.g., facets or flutes 12a in FIG. 1 or edge 47 in FIG. 6) be the off-axis type. Nor is it required that the reflecting surface be parabolic or a paraboloid. Other curves can be used, such as those which approximate parabolas or paraboloids and yet others are possible.

A simplified explanation of how the embodiments described above can generate a light beam, image or aspect of the type shown in FIG. 4 will be given. In FIG. 14, a light source 105 is located at the focus of a parabolic mirror 100. For ease of understanding, the light source will be shown and described as a candle flame, which is conceptually easy to understand. Of course, in reality, the flame 105 is light rays generated by a light source, such as that generated by the LEDs 24 and 26. An observer OB will see the flame 105. However, if three observers OB1, OB2, and OB3 are present, as in FIG. 15, each will see his/her own flame, independent of the others.

This can be explained by conceptually placing three mirrors MA, MB, and MC in the positions shown in FIG. 16. Each mirror MA, MB and MC reflects the flame 105 to a respective observer OB3, OB2 and OB1, respectively. The parabolic mirror 100 can be viewed as providing three annular ring-like mirrors R1-R3 in FIG. 17, which perform the function of the mirrors shown in FIG. 16.

Similarly, in FIG. 18, a light source containing three LEDs 27a, 27b and 27c will conceptually project multiple spots S onto the parabolic edge 47. Those will be transmitted by the lens 18 to form a column of spots C, analogous to the rows-and-columns labeled R and C in FIG. 4. If the parabolic edge 47 is replaced by facets or flutes 12a, then the transmitted rays R will diverge, as illustrated in FIGS. 4 and 19.

FIGS. 20-25 illustrate sections or fragmentary portions of the lens 18 in order to illustrate various variants of the shapes the lens 18 may take. The lens 18 can be viewed as a stack of individual lenses 18E, as illustrated in FIG. 20. The external surface of each lens 18E can be convex in the horizontal plane, as illustrated in FIG. 21, or can be flat in the horizontal plane, as illustrated in FIG. 22. Also, the external surface can be convex in the vertical plane, as illustrated in FIG. 23, or can be flat in the vertical plane, as illustrated in FIG. 24. As FIG. 25 indicates, there are four possible combinations.

The multiple spots S in FIG. 18 need not be generated by the multiple LEDs 27a, 27b or 27c. Instead, multiple internal reflections within plate or sheet 10 can generate the multiple images. For example, in FIG. 26, an imaginary single light source LS represents LED 24 or LED 26 in FIG. 1. That light source LS will be internally reflected by the walls 10a, 10b of the light guide LG, en route to the exit face 18a in FIG. 1, thereby producing multiple images, such as that indicated by the three images in FIG. 26.

It may be thought that the plate or sheet 10 of FIG. 1 can be eliminated, based on the incorrect reasoning that the plate merely re-directs a fan of light rays produced by the LEDs toward the lens 18. However, the reasoning is incorrect because the plate or sheet 10 also collimates the light into parallel rays, as indicated in FIG. 11. That is, if the plate or sheet 10, and thus edge 47, were not present, the light rays R emanating from the LED 24 would diverge as in FIG. 18, and they would continue to diverge as they reach the lens 18. But if the plate or sheet 10 is present, then the edge 47 of plate or sheet 10, if generally parabolic as in FIGS. 1 and 6, causes the rays R in FIG. 18 to become generally parallel, as in FIG. 11. If the edge 47 contains the plurality of edges 12 in FIGS. 1, 5 and 8, then the rays are still somewhat parallel, though diverging from each edge 12.

In one form of the invention, symmetry is significant. For example, the two sets of light rays or images, white and amber, of FIG. 4, are identical, or nearly so, because the LEDs are mirror-images of each other. They are positioned as are LEDs 24 and 26 in FIG. 18, and are mirror images. In contrast, if the LEDs 24 and 26 were placed at random positions, the images corresponding to those of FIG. 4 would also reflect this randomness and would not be identical.

In one form of the invention, the lens 18 is permanently attached or integrally molded with the plate or sheet 10.

One form of the invention is used for signaling, rather than illumination. That is, an ordinary headlight of a vehicle is used primarily to illuminate external objects for the benefit of the driver. The headlight also performs a subsidiary function of identifying the presence of the vehicle to other drivers. In contrast, a signal light, such as a turn signal light, is used to convey information to other drivers and not to illuminate external objects. One form of the invention is used primarily to issue signals and not to illuminate external objects. Consistent with this concept, one form of the invention is directed toward utilization of the lens 18 in FIG. 1 as a display screen to generate the images such as those shown in FIGS. 3A, 3B, and 4, and to generate those images with the maximum efficiency attainable.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting assembly for a vehicle, comprising:
 a light guide having a generally planar or sheet portion and a lens, said generally planar or sheet portion having an input face or edge and a reflective edge for reflecting light towards an exit surface or face of a lens;
 at least one light source for transmitting light, said at least one light source being operatively positioned relative to said input face or edge and transmitting light into said generally planar or sheet portion for reflection by said reflective edge toward said exit surface or face of said lens; and
 said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said reflecting edge is generally parabolic and each of said plurality of flutes or facets are convex with respect to said input face or edge.

2. The lighting assembly according to claim 1, wherein said reflective edge comprises said plurality of flutes or facets and reflects said light toward said exit surface or face of said lens.

3. The lighting assembly according to claim 1, wherein said lighting assembly comprises a plurality of light sources for producing a plurality of colors selected to perform a plurality of different functions, respectively, each of said plurality of light sources being energized independently to cause said light guide to perform a plurality of different functions, respectively.

4. The lighting assembly according to claim 3, wherein said plurality of different functions comprise a daytime running light function and a turn signal function, said plurality of light sources comprises at least one first LED that produces a white light for performing said daytime running light function and at least one second LED that produces an amber light for performing said turn signal function.

5. The lighting assembly according to claim 3, wherein said plurality of flutes or facets are adapted to define at least one of a plurality of convex reflectors or a plurality of diverging lenses within a light path of light rays generated by said plurality of light sources to cause said light rays to diverge as they exit the exit surface or face of said lens.

6. The lighting assembly according to claim 3, wherein said plurality of flutes or facets define a plurality of lenses within a light path of light rays generated by said plurality of light sources to cause said light rays emitted by said plurality of light sources to be produced in a predetermined beam pattern.

7. The lighting assembly according to claim 3, wherein said plurality of flutes or facets are tuned to at least one of said plurality of light sources.

8. The lighting assembly according to claim 3, wherein said plurality of light sources comprises a first colored light source that generates a first colored light and a second colored light source that generates a second colored light that is different from said first colored light, said lighting assembly generates
   i) a first visual pattern on said exit surface or face of said lens when said first colored light source is illuminated; and
   ii) a second visual pattern on said lens when said second colored light source is illuminated;
   wherein said first and second visual patterns are substantially similar.

9. The lighting assembly according to claim 1, wherein said plurality of flutes or facets are adapted to define at least one of a plurality of convex reflectors or a plurality of diverging lenses within a light path of light rays generated by said at least one light source to cause said light rays to diverge as they exit the exit surface or face of said lens.

10. The lighting assembly according to claim 1, and further comprising a plurality of convex reflectors, or diverging lenses, or both and along a light path within said lighting assembly, which cause said lens to display a visual image for each color of light, and the visual image produced by one of the colors is substantially identical to the visual image produced by the other color.

11. The lighting assembly according to claim 1, wherein said plurality of flutes or facets define a plurality of lenses within a light path of light rays generated by said at least one light source to cause said to provide a predetermined beam pattern.

12. The lighting assembly as recited in claim 1 wherein said plurality of facets are each curved and lie in at least one of a vertical plane or a horizontal plane with respect to said lens.

13. The lighting assembly as recited in claim 1 wherein said plurality of facets or flutes are each curved and lie in both a vertical plane and a horizontal plane with respect to an axis of said lens.

14. A lighting assembly for a vehicle, comprising:
   a light guide having a generally planar or sheet portion and a lens, said generally planar or sheet portion having an input face or edge and a reflective edge for reflecting light towards an exit surface or face of a lens;
   at least one light source for transmitting light, said at least one light source being operatively positioned relative to said input face or edge and transmitting light into said generally planar or sheet portion for reflection by said reflective edge toward said exit surface or face of said lens; and
   said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;
   wherein said reflective edge comprises said plurality of flutes or facets and reflects said light toward said exit surface or face of said lens;
   wherein said reflecting edge is generally parabolic and each of said plurality of flutes or facets are convex with respect to said input face or edge.

15. A lighting assembly for a vehicle, comprising:
   a light guide having a generally planar or sheet portion and a lens, said generally planar or sheet portion having an input face or edge and a reflective edge for reflecting light towards an exit surface or face of a lens;
   at least one light source for transmitting light, said at least one light source being operatively positioned relative to said input face or edge and transmitting light into said generally planar or sheet portion for reflection by said reflective edge toward said exit surface or face of said lens; and
   said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;
   wherein said lighting assembly comprises a plurality of light sources for producing a plurality of colors selected to perform a plurality of different functions, respectively, each of said plurality of light sources being energized independently to cause said light guide to perform a plurality of different functions, respectively;
   wherein said reflecting edge is generally parabolic and each of said plurality of flutes or facets are convex with respect to said input face or edge.

16. A lighting assembly for a vehicle, comprising:
   a light guide having a generally planar or sheet portion and a lens, said generally planar or sheet portion having an input face or edge and a reflective edge for reflecting light towards an exit surface or face of a lens;
   at least one light source for transmitting light, said at least one light source being operatively positioned relative to said input face or edge and transmitting light into said generally planar or sheet portion for reflection by said reflective edge toward said exit surface or face of said lens; and said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said plurality of flutes or facets are aligned along a generally parabolic curve.

17. A lighting assembly for a vehicle, comprising:

a light guide having a generally planar or sheet portion and a lens, said generally planar or sheet portion having an input face or edge and a reflective edge for reflecting light towards an exit surface or face of a lens;

at least one light source for transmitting light, said at least one light source being operatively positioned relative to said input face or edge and transmitting light into said generally planar or sheet portion for reflection by said reflective edge toward said exit surface or face of said lens; and said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said lens comprises an internal wall defining an aperture, at least a portion of said internal wall comprising said plurality of flutes or facets which define a plurality of lenses within a light path of light rays generated by said at least one light source.

18. The lighting assembly according to claim 17, wherein said internal wall is generally U-shaped and defines a longitudinal opening or slot in said lens, said light rays from said at least one light source passing through said longitudinal opening or slot before they exit said exit surface.

19. A lighting assembly for a vehicle, comprising:

a light guide having a generally planar or sheet portion and a lens, said generally planar or sheet portion having an input face or edge and a reflective edge for reflecting light towards an exit surface or face of a lens;

at least one light source for transmitting light, said at least one light source being operatively positioned relative to said input face or edge and transmitting light into said generally planar or sheet portion for reflection by said reflective edge toward said exit surface or face of said lens; and said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said lighting assembly comprises a plurality of light sources for producing a plurality of colors selected to perform a plurality of different functions, respectively, each of said plurality of light sources being energized independently to cause said light guide to perform a plurality of different functions, respectively;

wherein said lens comprises an internal wall defining an aperture, at least a portion of said internal wall comprising said plurality of flutes or facets which define a plurality of lenses within a light path of light rays generated by said plurality of light sources.

20. A lighting assembly for a vehicle, comprising:

a light guide having a generally planar or sheet portion and a lens, said generally planar or sheet portion having an input face or edge and a reflective edge for reflecting light towards an exit surface or face of a lens;

at least one light source for transmitting light, said at least one light source being operatively positioned relative to said input face or edge and transmitting light into said generally planar or sheet portion for reflection by said reflective edge toward said exit surface or face of said lens; and said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said plurality of flutes or facets are located on said exit surface or face of said lens and define a plurality of lenses within a light path of light rays generated by said at least one light source.

21. A lighting assembly for a vehicle, comprising:

a light guide having a generally planar or sheet portion and a lens, said generally planar or sheet portion having an input face or edge and a reflective edge for reflecting light towards an exit surface or face of a lens;

at least one light source for transmitting light, said at least one light source being operatively positioned relative to said input face or edge and transmitting light into said generally planar or sheet portion for reflection by said reflective edge toward said exit surface or face of said lens; and said reflective edge of said light guide comprising a plurality of flutes or facets for controlling a spread and distribution of said light transmitted by said at least one light source, each of said plurality of flutes or facets being integrally formed in said reflective edge and are generally U-shaped and directed inward toward an interior of said generally planar or sheet portion and direct light from said input face or edge to said lens;

wherein said lighting assembly comprises a plurality of light sources for producing a plurality of colors selected to perform a plurality of different functions, respectively, each of said plurality of light sources being energized independently to cause said light guide to perform a plurality of different functions, respectively;

wherein said plurality of flutes or facets are located on said exit surface or face of said lens and define a plurality of lenses within a light path of light rays generated by said plurality of light sources.

* * * * *